May 5, 1970     E. R. HARTMAN     3,510,146

VEHICLE TOW BAR

Filed March 6, 1968

INVENTOR
EDWARD R. HARTMAN
BY Beaman & Beaman

ATTORNEYS

United States Patent Office 3,510,146
Patented May 5, 1970

3,510,146
VEHICLE TOW BAR
Edward R. Hartman, 336 Grand St.,
Springport, Mich. 49284
Filed Mar. 6, 1968, Ser. No. 710,869
Int. Cl. B60d 1/00
U.S. Cl. 280—491                           8 Claims

ABSTRACT OF THE DISCLOSURE

A tow bar structure for vehicles having a pair of parallel chassis members vertically spaced from each other which extend transversely across the front end of the vehicle. The tow bar structure includes clamp members adapted to be mounted upon the chassis members in a positive manner, yet are quickly releasable from the chassis members, and such clamps are attachable to a tow bar tongue adapted to be connected to the towing vehicle. The tow bar structure is characterized by its ease of installation and positive manner of connection to the towed vehicle.

BACKGROUND OF THE INVENTION

The invention pertains to tow bar structure of the rigid type wherein a rigid tow bar tongue is connected to the towed vehicle frame or chassis in a positive manner to permit safe and vibration free vehicle towing.

A number of devices have been proposed for towing vehicles, such as are commonly used to transport used vehicles, disabled vehicles, and vehicles that are to be used as auxiliary transportation. For instance, it is now a common practice to tow a small passenger automobile behind a pick-up truck camping unit, or self-propelled mobile home, in order to use the smaller vehicle for transportion at the campsite.

In a tow bar structure it is of utmost importance that a safe connection between the towed and towing vehicles be accomplished which causes the towed vehicle to be self-steering and "track" behind the towing vehicle. However, as the use of the tow bar is often for short periods of time, such as when the tow bar is used to transport a disabled or repaired vehicle from the vehicle owner's premises, or location of disability, to a service garage, a tow bar that is excessively difficult to attach to the towed vehicle is impractical. Presently available tow bar devices are often attached to the towed vehicle's bumper, and the bolts and other clamps used to effect the connection to the bumper require time consuming operations, and bumper connected tow bars do not provide optimum safety and towing characteristics due to the resiliency of the bumper, the wide variety of bumper configurations present, and the difficulty in producing a positive connection to the bumper. Patented tow bar devices currently available are represented by U.S. Pats. 1,478,041; 2,712,877 and 2,796,-183. The invention is intended to be an improvement over towing devices of the type illustrated in these patents.

SUMMARY OF THE INVENTION

It is the purpose of the invention to provide vehicle tow bar structure which is of an economical construction, positive in its connection to the towed vehicle, readily and quickly installable on the towed vehicle, and quickly and easily removed therefrom. In particular, the invention is directed to a vehicle tow bar structure which attaches to spaced parallel chassis members transversely disposed across the front end of the vehicle, such as the torsion bar housings of a Volkswagen. The vehicle tow bar of the invention is especially suited for towing Volkswagen automobiles.

The tow bar construction of the invention utilizes a clamp having a hooked portion which is passed over the uppermost of the chassis members. The lower portion of the clamp includes a recess for selectively receiving the lowermost chassis member, and this recess is closed by a gate member in the form of a pin after the lowermost chassis member is received in the recess. A bracket is attached to the clamp, and in the normal practice two clamps will be mounted upon the vehicle chassis members in spaced relation to each other in a transverse manner relative to the vehicle. A tow bar tongue having spaced anchors at its rear end is connected to the clamps, and the front end of the tow bar tongue includes a hitch for connecting the tow bar structure to the towing vehicle.

By employing a hooked upper portion on the vehicle chassis member clamps, the clamps may be quickly mounted upon the vehicle, and the provision of a pin to maintain the lowermost chassis member in the clamp recess permits easy mounting and removal of the clamps to the vehicle, yet provides a firm and positive connection of the towing apparatus to the towed vehicle. The connection of the tow bar tongue to the clamps is also accomplished through a pin which may be easily removed, and in this manner it is possible to disconnect the tow bar from the clamps for facilitating attachment of the clamps to the vehicle. Also, if the vehicle is to be towed on a regular basis, which would be the case with a vehicle used for auxiliary transportation purposes, it is possible to leave the clamps permanently mounted upon the vehicle and merely attach the tow bar tongue to the clamps when desired.

As the tow bar clamps are mounted on the chassis of the vehicle on the underside thereof, the presence of the clamps is not apparent, nor adversely affects the operation of the towed vehicle in any manner.

Towing apparatus in accord with the invention can be fabricated from readily available materials and the cost thereof is reasonable, the towing apparatus is of a relatively light weight and the installation and removal of the clamps relative to the towed vehicle can be readily accomplished by unskilled personnel.

BRIEF DESCRIPTION OF THE DRAWING

The operation and advantages of towing apparatus in accord with the invention will be apparent from the following description and accompanying drawings wherein.

DESCRIPTION OF THE PREFERRED EMBODIMENT

Figure 1:
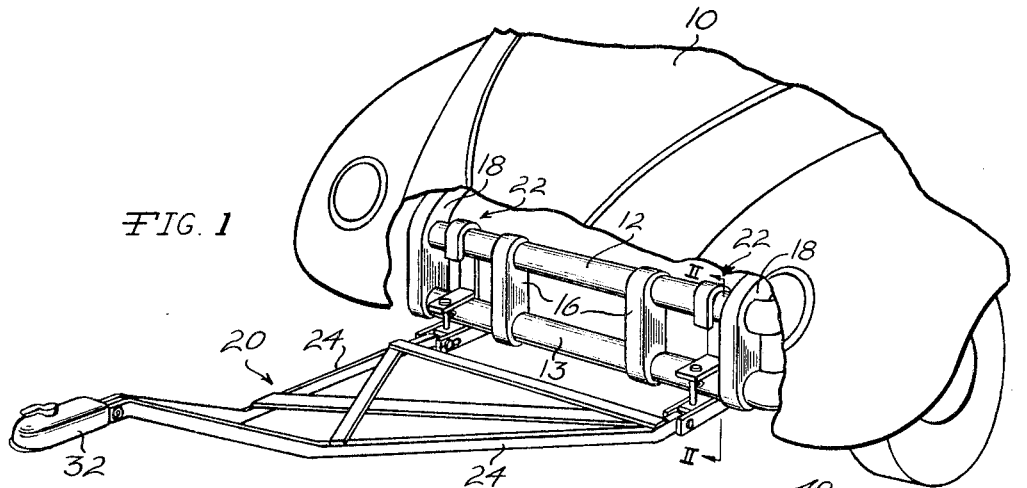
FIG. 1 is a perspective view of towing bar apparatus in accord with the invention as mounted upon a vehicle, a portion of the vehicle being cut away for purpose of illustration.

The vehicle 10 with which the towing apparatus of the invention is particularly suited includes a pair of substantially parallel chassis members 12 and 13 transversely disposed across the length of the vehicle. In the illustrated embodiment the vehicle 10 is a Volkswagen, and the members 12 and 13 constitute tubular housings for the torsion bars 14, FIG. 2, utilized in the front wheel suspension system. The tubular members 12 and 13 are maintained in spaced relationship by bridge members 16, and are affixed to the other portions of the underside of the vehicle by support members 18, FIG. 1. The members 12 and 13 are readily accessible from the underside of the vehicle, and form a rigid part of the vehicle structure.

The tow bar apparatus of the invention consists of two basic components, namely, the tow bar tongue generally indicated at 20, and clamps 22 which are mounted upon the vehicle.

Figure 2:
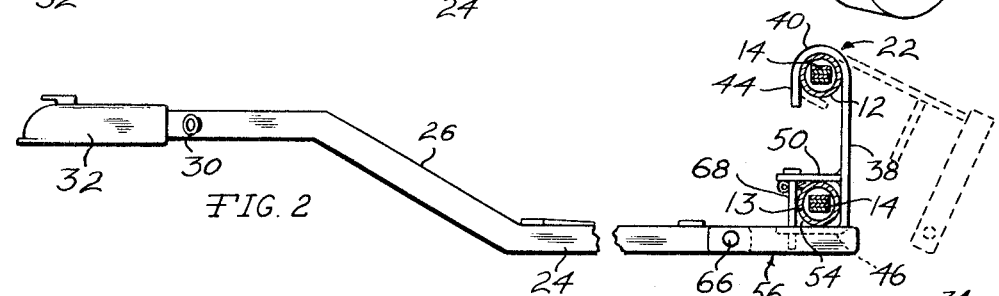
FIG. 2 is an elevational, sectional view as taken along section II—II of FIG. 1.
Figure 4:
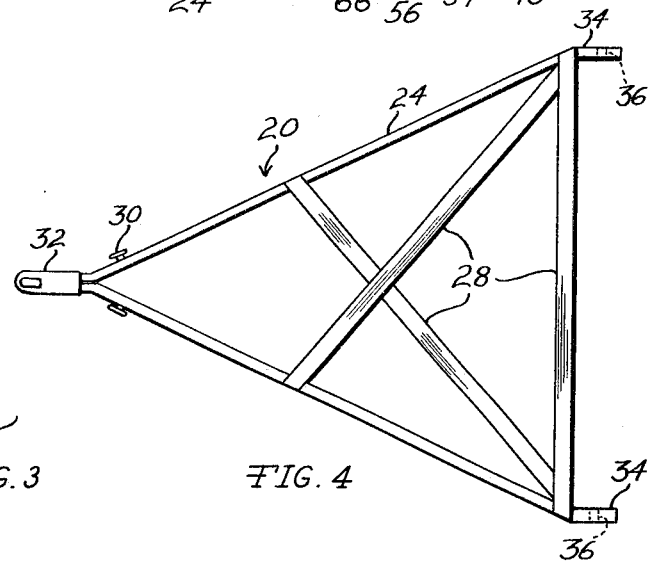
FIG. 4 is a plan view of the tow bar tongue.

The tow bar tongue 20 is preferably fabricated of tubular members 24 of a rectangular or box configuration which, in the plan view, FIG. 4, are related in a V configuration, and in the elevational direction, FIG. 2, are provided with an upwardly formed portion 26. The members 24 are reinforced by metal straps 28 welded thereto, and rings 30 may be attached to the members in order to receive safety chains from the towing vehicle. The front end of the tow bar tongue 20 mounts attaching means 32 for attaching the tow bar structure to the towing vehicle. This means may consist of the well-known trailer hitch ball socket, as illustrated.

The rear end of the tow bar tongue is provided with a pair of spaced parallel anchors 34, which may consist of extension of the members 24, and each of the anchors is provided with the transversely disposed bore 36 for receiving a fastening pin as will be later described.

The two clamps 22 used with the towing bar apparatus are identical in construction and configuration and are preferably formed of bar stock steel having a rectangular cross sectional configuration. The clamps include a column portion 38 having an upper portion 40 and a lower portion 42. The upper portion 40 is bent into a hook configuration including a downwardly extending portion 44 which extends downwardly sufficiently to allow for various spacings between the members 12 and 13 present in various models of Volkswagens. The downwardly extending portion 44, and the upper column portion define opposed surfaces which will engage the front and rear portions of the upper tubular chassis member 12, FIG. 2, and the radius of the hooked portion 40 is formed to correspond to the tubular diameter of the upper member 12. In this manner the hooked portion 40 is firmly engaged upon the member 12 and the inner surfaces of portions 38 and 44 prevent movement of the clamp upper portion in a forward or rear direction.

The lower portion of the column 38 is bent to form the deformed portion 46 which is at right angles to the column 38, a hole 48 is formed in the deformed portion 46 spaced from the column. A leg element 50 is welded to the column portion 38 in parallel space relationship to the deformed portion 46 substantially at right angles to the column 38 and is provided with a hole 52 in alignment with the hole 48. Thus, the deformed portion 46 and the element 50 define leg members extending from a base portion, defined by the intermediate column portion 38, wherein a U-shaped recess 54 is formed adapted to closely receive the lowermost chassis member 13 as shown in FIG. 2. The vertical spacing between the upper surface of the deformed portion 46 and the lower surface of the leg element 50 is such as to be only slightly larger than the diameter of the lower chassis member 13.

Figure 3:
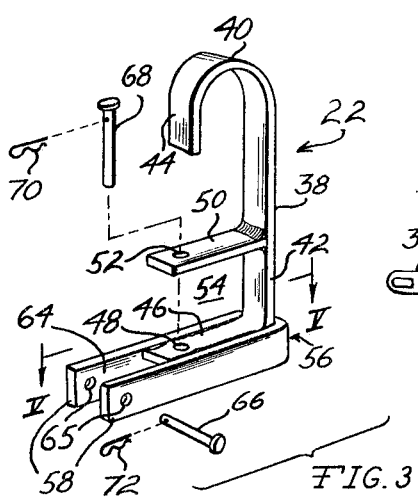
FIG. 3 is an enlarged perspective view of one of the clamps of the towing bar apparatus, the pins being shown in nonoperative positions.
Figure 5:
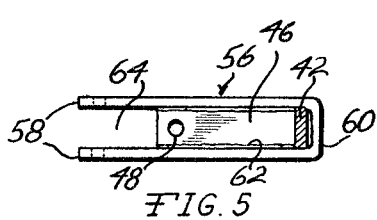
FIG. 5 is a plan sectional view of a clamp taken along section V—V of FIG. 3.

A U-shaped bracket 56 having legs 58 and a base 60 extends about the column 38 and the deformed portion 46 as is apparent in FIGS. 3 and 5. The bracket 56 is welded to the column portion and the deformed portion at 62, and on the underside of the deformed portion 46, as well as at the column. The legs 58 extend beyond the end of the deformed portion 46 forming a recess 64 for receiving an anchor of the tow bar tongue. Holes 65 formed in the legs 58 are adapted to receive the fastening pin 66.

To install the clamps 22 upon the chassis members 12 and 13 the clamps 22 will normally be disconnected from the anchors 34 of the tow bar tongue 20 by removing the pins 66. Also, the pins 68 will be removed from the holes 48 and 52 of the clamps. The clamps 22 are then located behind the members 12 and 13 and the hook portion 40 is slipped over the upper member 12 while the clamp is tilted in the position shown in dotted lines in FIG. 2. Thereupon, the clamps 22 may be pivoted in the clockwise forward direction from the dotted line position of FIG. 2 to the full line position thereof. This movement positions the lowermost member 13 within the clamp recess 54 and disposes the bracket column portion 38 in a horizontal direction. The pins 68 are then inserted into the holes 52 and 48, and are maintained in position by the retainer 70 inserted through a hole in the pins adjacent the lowermost surface of the leg elements 50. In this manner the pins 68 close the "gate" of the recesses 54 and forms an opposing surface to the inside surface of the column base portion to lock the lower chassis member 13 in the clamp recess.

Both clamps 22 are assembled to the chassis members 12 and 13 in an identical manner, and after being attached to the chassis members the tow bar tongue anchors 34 are inserted into the recesses 64 defined by the bracket legs 58 and pins 66 are inserted in the leg holes 65 and the anchor holes 36 to form a pivotal connection between the tow bar tongue 20 and the clamps 22. The pin retainers 72 are inserted through holes in the end of the pins 66 to complete the connection.

The disassembly of the towing apparatus from the vehicle is the reverse of the assemblying procedure.

It will be appreciated that the above described structure produces a firm and positive connection of the clamps 22 to the vehicle, and that the clamps are connected to both of the chassis members 12 and 13 and include opposed surfaces on the forward and rear portions of the members. Thus, forward or rear movement of the clamps on the chassis members is prevented and a safe and positive towing of the vehicle 10 will be produced.

If the tow bar tongue apparatus is to be used regularly to tow the vehicle 10 the clamps 22 may be permanently retained upon the vehicle and the pins 66 need merely be inserted into the tow bar anchors 34, or removed therefrom, in order to attach or remove the tow bar tongue to the clamps, when desired. The presence of the clamps on the members 12 and 13 in no way interferes with the operation of the vehicle.

It is appreciated that modifications to the invention may be apparent to those skilled in the art without departing from the inventive concept.

What is claimed is:

1. In a tow bar structure for vehicles having a pair of substantially parallel chassis members vertically spaced from each other and transversely disposed to the length of the vehicle wherein front and rear portions are defined on each of said members, a vehicle chassis member mounting clamp, said clamp including a first end portion defining a first set of relatively fixed opposed spaced surfaces adapted to be disposed in opposed embracing relation to the front and rear portions of one of said chassis members, a second end portion defined on said clamp defining a second set of opposed spaced surfaces adapted to be disposed in opposed embracing relation to the front and rear portions of the other of said chassis members, releasable surface defining means defining at least one of said opposed spaced surfaces on said second end portion, said releasable surface defining means being selectively positionable between a first position removed from an opposed relationship with its normally associated opposed spaced surface to permit mounting of the clamp upon the vehicle chassis members and a second position in opposed relation to its normally associated opposed spaced surface locking the clamp upon the vehicle chassis members, and tow bar tongue attachment means defined upon said clamp.

2. In a tow bar structure for vehicles as in claim 1, a towing bar tongue having a front end and a rear end, towing vehicle attaching means defined at said tongue front end, a pair of spaced clamp receiving anchors defined at said tongue rear end, a vehicle chassis member mounting clamp releasably attached to each of said anchors.

3. In a tow bar structure for vehicles having a pair of substantially parallel chassis members vertically spaced from each other and transversely disposed to the length of the vehicle wherein front and rear portions are defined upon each of said members, a vehicle chassis member mounting clamp, said clamp including an upper portion having a hook configuration having opposed spaced surfaces adapted to be disposed in opposed embracing relation to the front and rear portions of the uppermost chassis member, a lower portion defined on said clamp having opposed spaced surfaces adapted to be disposed in opposed embracing relation to the front and rear portions of the lowermost chassis member, said lower portion including a U-shaped configuration having a pair of substantially horizontally disposed leg elements extending from a base, a removable pin extending between said leg elements in a spaced relationship to said base, said base and pin defining said opposed spaced surfaces of said lower portion, and tow bar tongue attachment means defined upon said clamp.

4. In a tow bar structure as in claim 3 wherein said clamp includes a vertically disposed column having an upper end and a lower end, said hook configuration being defined at said column upper end and said column lower end constituting said base, said tow bar tongue attachment means being attached to said column lower end.

5. A tow bar structure for vehicles having a pair of substantially parallel chassis members vertically spaced from each other and transversely disposed to the length of the vehicle comprising, in combination, a towing bar tongue having a front end and a rear end, towing vehicle attaching means defined at said tongue front end, a pair of spaced clamp anchors defined at said tongue rear end, a vehicle chassis member mounting clamp affixed to each of said towing bar anchors, each of said clamps including a vertically disposed column having an upper portion and a lower end, a hook portion defined at said column upper portion adapted to extend over the uppermost chassis member, a pair of spaced elements defined upon and extending in a like direction from said column lower portion defining a lowermost chassis member receiving recess, and a movable gate member extending between said spaced elements remote from said column selectively closing said recess to retain the lowermost vehicle chassis member therein.

6. In a towing bar structure as in claim 5 wherein said clamps each include a pair of spaced leg members disposed adjacent said lowermost chassis member receiving recess, said leg members of each clamp defining a recess receiving a tow bar anchor, and removable fastening means extending between said leg members of a common clamp releasably affixing a tow bar anchor therebetween.

7. In a towing bar structure as in claim 5 wherein said column lower end includes a deformed portion extending from said column in the same direction therefrom as said hook portion, said deformed portion forming one of said spaced elements, aligned holes defined in said deformed portion and the other of said spaced elements, said gate member comprising a removable pin received within said holes.

8. In a towing bar structure as in claim 7, a U-shaped bracket affixed to each of said column deformed portions, said brackets each having spaced leg members extending toward said tow bar tongue defining a recess receiving a tow bar anchor, and removable fastening means extending between the leg members of a common clamp releasably affixing a tow bar tongue therebetween.

References Cited

UNITED STATES PATENTS

| | | | |
|---|---|---|---|
| 994,374 | 6/1911 | Childs | 280—493 X |
| 1,476,638 | 12/1923 | Osborn | 280—503 X |
| 2,524,669 | 10/1950 | Knoblauch | 280—491 X |
| 2,444,086 | 6/1948 | Baker | 280—494 |
| 2,553,229 | 5/1951 | Barhorst | 214—86 |
| 2,918,310 | 12/1959 | Carson | 280—478 |
| 3,154,204 | 10/1954 | La Venture | 280—402 X |
| 3,281,162 | 10/1966 | Carson | 280—493 X |
| 3,410,579 | 11/1968 | Jenson | 280—491 |

LEO FRIAGLIA, Primary Examiner

U.S. Cl. X.R.

280—494